Feb. 6, 1968 JAMES E. WEBB 3,367,121
ADMINISTRATOR OF THE NATIONAL AERONAUTICS
AND SPACE ADMINISTRATION
REFRIGERATION APPARATUS
Filed Aug. 19, 1966 2 Sheets-Sheet 1
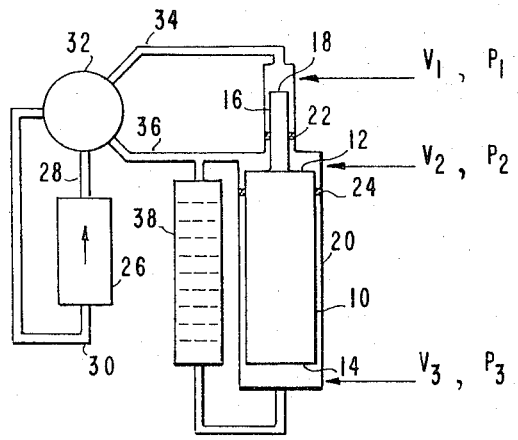
FIG. I
PRIOR ART
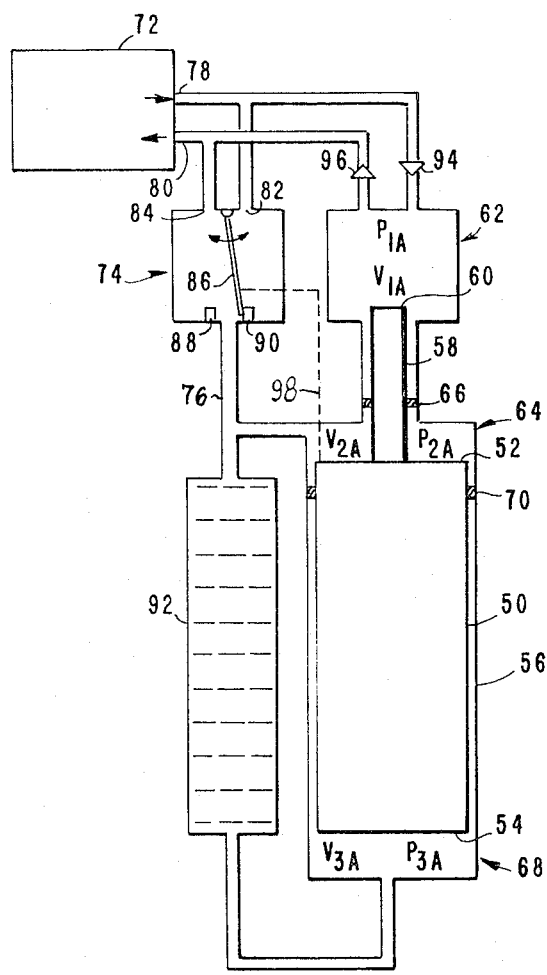
FIG. 2
INVENTOR.
WALTER H. HIGA
BY
ATTORNEYS Feb. 6, 1968  JAMES E. WEBB  3,367,121
ADMINISTRATOR OF THE NATIONAL AERONAUTICS
AND SPACE ADMINISTRATION
REFRIGERATION APPARATUS Filed Aug. 19, 1966  2 Sheets-Sheet 2

*INVENTOR.*
WALTER H. HIGA
BY Daniel Leslie
9. McCay
ATTORNEYS

United States Patent Office 3,367,121
Patented Feb. 6, 1968

3,367,121
REFRIGERATION APPARATUS
James E. Webb, administrator of the National Aeronautics and Space Administration, with respect to an invention of Walter H. Higa, Tujunga, Calif.
Filed Aug. 19, 1966, Ser. No. 574,282
9 Claims. (Cl. 62—6)

The invention described herein was made in the performance of work under a NASA contract and is subject to the provisions of Section 305 of the National Aeronautics and Space Act of 1958, Public Law 85–568 (72 Stat. 435; 42 USC 4257).

This invention relates generally to refrigeration apparatus and more particularly to improvements in apparatus capable of producing temperatures below −100° C. (173° K).

U.S. Patent 3,119,237 discloses a method and apparatus for producing very low temperatures based upon a concept known as gas balancing. Briefly, the gas balancing concept involves balancing several confined gas volumes so that they interact with one another whereby gas compression and expansion is selectively controlled to produce a net refrigeration at one or more points in the system. As disclosed in the cited patent, a motor driven valve is employed to steer high and low pressure gas to drive a displacer for effecting the desired gas compression and expansion.

The present invention is based on the recognition that by employing a constant intermediate pressure on one surface of a piston driving the displacer, the required valving arrangement can be considerably simplified, as for example, compared to the apparatus of the cited patent.

In addition to effecting a considerable simplification in the valving arrangement required, apparatus constructed in accordance with the present invention has the desirable characteristic of being self-starting.

Although the teachings of the invention are particularly useful in conjunction with gas balancing refrigeration apparatus of the type disclosed in the cited patent, it is specifically pointed out that the teachings of the invention are also applicable to other types of refrigeration systems; for example only, Sterling cycle refrigeration systems can advantageously employ the teachings of the present invention.

Briefly, in accordance with the present invention, a displacer is mounted for reciprocal movement between first and second chambers. The free surface of a piston having a second surface attached to one end surface of the displacer, is exposed to a constant intermediate pressure. Movement of the displacer controls a two position valve which couples either high or low pressure directly to one end surface of the displacer and through a regenerator to a second end surface of the displacer. In operation, the displacer is driven in the direction of the piston when a high pressure exists on both end surfaces thereof as a consequence of the difference in pressure on the displacer and piston surfaces. Movement of the displacer switches the two position valve to thereafter establish a low pressure on the displacer end surfaces resulting in the intermediate pressure on the piston surface driving the displacer back to its initial position.

The novel features that are considered characteristic of this invention are set forth with particularity in the appended claims. The invention will best be understood from the following description when read in connection with the accompanying drawings, in which:

FIGURE 1 is a schematic illustration of a refrigeration system of the type disclosed in U.S. Patent 3,119,237;

FIGURE 2 is a schematic illustration of a refrigeration apparatus in accordance with the present invention;

Figure 3:
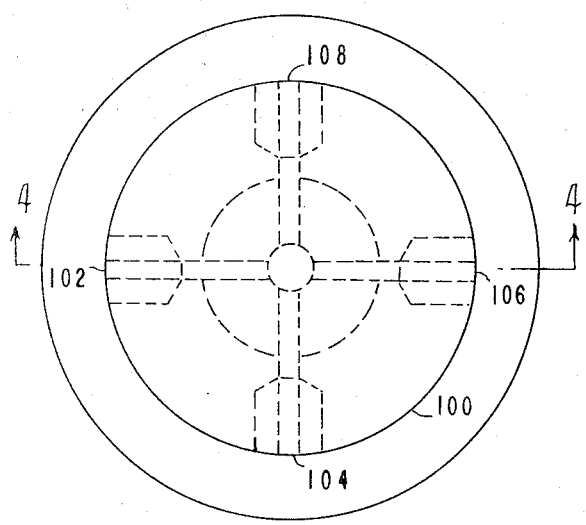
FIGURE 3 is a plan view of a preferred valving arrangement which can be employed in accordance with the present invention.

Attention is now called to FIGURE 1 which illustrates a refrigeration system of the type disclosed in U.S. Patent 3,119,237. The system of FIGURE 1 includes a displacer 10 having first and second end surfaces 12 and 14. Extending from the surface 12 is a piston 16 having a free end surface 18. The displacer 10 is mounted for reciprocal movement in a housing 20.

The surface 18 is exposed to a pressure P1 existing in a chamber or volume V1. A seal 22 isolates the volume V1 from a second chamber or volume V2. The surface 18 of the displacer 10 is exposed to the pressure P2 in volume V2. A seal 24 on the displacr isolates the volume V2 from a third chamber or volume V3 in which the surface 14 is exposed to a pressure P3.

A compressor 26 is provided having a high pressure port 28 and a low pressure port 30 both of which communicate with a motor driven valve 32. The motor driven valve 32 is provided with a port 34 in communication with the volume V1 and a port 36 which is coupled to the volume V2 and to a first or upper end of a regenerator 38. The lower end of the regenerator 38 is coupled to the volume V3. As is well known in the art, the regenerator constitutes a device having a low heat conduction characteristic in a longitudinal direction, i.e., in the desired direction of gas flow and in high heat conduction characteristic in the transverse direction. Also, the regenerator will preferably have a high heat capacity. As a consequence of these characteristics, the regenerator should be able to maintain a large temperature gradient from one end to the other. A suitable regenerator can consist of a relatively long tube filled with lead pellets, for example.

The specific structural details of the apparatus of FIGURE 1 are set forth in U.S. Patent 3,119,237 and will thus not be repeated here. However, the operation of the apparatus of FIGURE 1 will be briefly discussed. Consider initially that the displacer 10 is in its uppermost position and that the valve 32 is driven by the motor (not shown) to admit high pressure gas to volume V1. As a consequence, the displacer 10 is forced downwardly to reduce the volume V3 to nearly zero, while increasing the volume V2 to a maximum. Subsequently, the valve 32 maintains the pressure in volume V1 and simultaneously admits high pressure gas directly to volume V2 and through regenerator 38 to volume V3. During this period, the regenerator 38 removes heat from the gas stored in volume V3. Thereafter, the valve 32 releases the pressure in volume V1 while maintaining the pressure in volumes V2 and V3. This unbalancing of pressure results in displacer 10 moving upwardly to thus decrease the volumes V1 and V2 while increasing the volume V3 to a maximum volume. That is, the gas previously in volume V2 is displaced by the displacer 10 and driven through the regenerator to volume V3. The regenerator of course acts to remove some heat from the gas flowing from top to bottom therethrough. Subsequently, pressure is released in volumes V2 and V3 permitting the gas in volume V3 to expand and thus cool. In addition to being useful for cooling a load (not shown), the cool gas will remove some heat from the regenerator 38 concurrent with the initiation of a subsequent cycle in which high pressure gas is admitted to volume V1 to drive the displacer down.

In order to properly control the application of the high pressure gas to the various volumes at the appropriate times, a reasonably complex and sophisticated motor driven valving arrangement is required. Such an arrangement is disclosed in the aforecited patent. In accordance with the present invention, a considerably simpler valving arrangement can be employed by maintaining the pressure on the free surface of the piston at a constant intermediate level.

More particularly, attention is now called to FIGURE 2 which schematically illustrates a preferred embodiment of the present invention. The embodiment of FIGURE 2 includes a displacer 50, having an upper surface 52 and a lower surface 54, mounted for reciprocal movement in a housing 56. Extending from the surface 52 is a piston 58 having a free end surface 60.

The piston surface 60 is exposed to a large chamber 62 defining a volume V1A in which the pressure is identified as P1A. The surface 52 is exposed to a chamber 64 having a volume identified as V2A and a pressure identified as P2A. A seal 66 isolates chamber 62 from chamber 64. Surface 54 is exposed to a chamber 68 whose volume and pressure are respectively identified as V3A and P3A. A seal 70 isolates chamber 64 from chamber 68.

A source 72, e.g., a compressor, of high and low pressure gas is connected through a valve assembly 74 to a conduit 76. More particularly, the source 72 has a high pressure port 78 and a low pressure port 80 which are respectively coupled to inlet ports 82 and 84 of the valve assembly 74. The valve assembly can comprise a simple two position valve and is schematically illustrated in FIGURE 2 as including a hinged member 86 adapted to engage either of stops 88 and 90. Thus, when the member 86 engages stop 90, the low pressure port 84 communicates with conduit 76. On the other hand, when member 86 engages stop 88, the high pressure port 82 communicates with conduit 76.

Conduit 76 is coupled directly to chamber 64 and through regenerator 92 to chamber 68. In order to maintain the pressure P1A in chamber 62 constant, for reasons which will be better understood hereinafter, the chamber 62 communicates through check valves 94 and 96 respectively with the high and low pressure ports 78 and 80 of the compressor 72. Dotted line 98 in FIGURE 2 represents a mechanical linkage, illustrated in detail in FIGURES 3 and 4, coupling the displacer 50 to the valve member 86.

In order to understand the operation of the apparatus of FIGURE 2, initially consider that the displacer 50 is in its uppermost position such that the volume V2A is reduced to a minimum and the volume V3A is at a maximum. In order to force the displacer 50 downwardly, the valve member 86 is moved to the position illustrated in FIGURE 2 in which the low pressure port 80 communicates with the conduit 76. As a consequence, the pressure P2A and subsequently the pressure P3A due to the time lag introduced by the regenerator 92 will decrease below the constant intermediate pressure P1A established in chamber 62. Consequently, the higher pressure on the surface 60 of the piston 58 will force the displacer 50 downwardly to maximize the volume V2A and minimize the volume V3A. The displacer 50 is coupled through linkage 98 to the valve member 86 such that when the displacer 50 moves to its lowermost position, the position of the valve member 86 is switched to thereby communicate high pressure port 78 with conduit 76. As a consequence, the pressure P2A in chamber 64 will initially increase thereby maintaining the displacer in its lowermost position for a short time. After the time delay introduced by the regenerator 92, the pressure P3A in chamber 68 will increase until the pressure P2A equals pressure P3A. Inasmuch as both pressures P2A and P3A will be greater than the intermediate pressure P1A, the displacer 50 will be driven upwardly thereby displacing the gas within the volume V2A and driving it through the regenerator to volume V3A. Of course, when the displacer 50 is driven to its uppermost position, the position of the valve member 86 is switched to thereafter communicate the low pressure port 80 with conduit 76. This permits the gas within the volume V3A to expand and cool. The displacer 50 will again remain stationary for a short interval because the pressure P3A will be larger than the pressure P2A. After the interval attributable to the regenerator 92, the pressures P3A and P2A will equalize, both being less than the pressure P1A. As a consequence, the displacer 50 will be forced downwardly thus driving the cold gas out of volume V3A through the regenerator to remove some heat therefrom to thereby better enable the regenerator to remove heat from gas flowing therethrough during a subsequent cycle.

The relief valves 94 and 96 maintain the pressure P1A constant thus compensating for any small leaks which might be present. That is, if the pressure P1A is reduced due to the presence of a leak, the relief valve 94 will open thus communicating the high pressure port 78 with the chamber 62 to increase the pressure P1A. Similarly, if the pressure P1A increases for any reason, the relief valve 96 will open to communicate the low pressure port 80 with the chamber 62 and thus reduce the pressure P1A.

Figure 4:
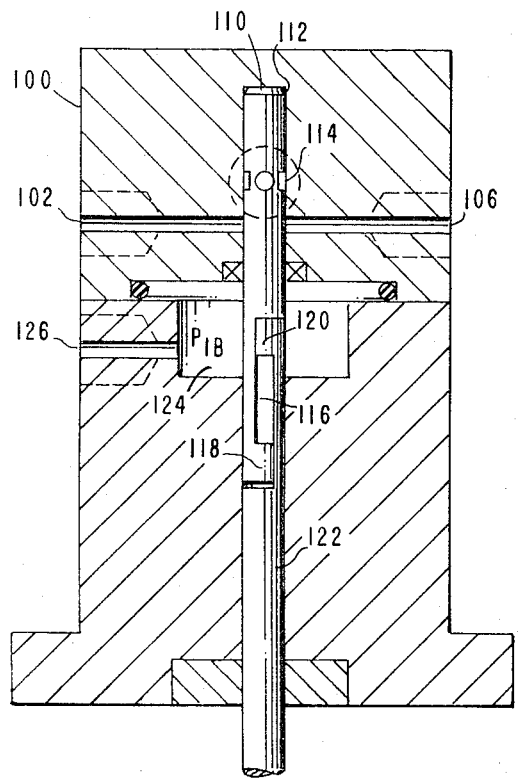
FIGURE 4 is a sectional view taken along the plane 4—4 of FIGURE 3.

Attention is now called to FIGURES 3 and 4 which illustrate a preferred embodiment of the valve assembly 74 shown in FIGURE 2. More particularly, the valve assembly of FIGURES 3 and 4 is comprised of a housing 100 through which extend radially projecting ports 102, 104, 106, and 108. Ports 102 and 106 are aligned in the same horizontal plane as shown in FIGURE 4. Similarly, ports 104 and 108 are aligned in the same horizontal plane which is different from the plane of ports 102 and 106. Port 102 is adapted to be coupled to the high pressure port 78 of the compressor 72 shown in FIGURE 2. Port 104 on the other hand is adapted to be coupled to the low pressure port 80 of compressor 72. Ports 106 and 108 are adapted to be coupled to the conduit 76 shown in FIGURE 2 which, it will be recalled, communicates with the regenerator 92 and chamber 64.

Contained within the housing 100 is a valve member 110 adapted to move reciprocally in channel 112. The valve member 110 is provided with an annular slot 114 adapted to communicate opposed ports lying in the same plane. Thus, when the valve member 110 is in its upper position as illustrated in FIGURE 4, the annular slot 114 is aligned in the horizontal plane of the ports 104 and 108. Thus, the low pressure port 80 of the compressor 72 is coupled to the conduit 76. On the other hand, when the annular slot 114 is aligned in the plane of the ports 102 and 106, the high pressure port 78 of the compressor 72 communicates with the conduit 76.

A long keyway 116 is defined in the lower end of the valve member 110. More particularly, the keyway 116 is defined between the main body of the valve member 110 and a terminal stop 118. A terminal key 120 is defined on the upper end of the drive piston 122. The key 120 is adapted to slide in the keyway 116. Thus, the valve member 110 is moved only during a small portion of the movement of the piston 122. More particularly, when the piston 122 (corresponding to the piston 58 of FIGURE 2) is moved downwardly, the key 120 will engage the terminal stop 118 toward the end of the piston movement to thus draw the valve member 110 downwardly to align the annular slot 114 with the ports 102 and 106. On the other hand, when the piston 122 is moved upwardly, the key 120 will reach the end of the keyway 116 toward the end of the piston movement and only then will the annular slot 114 communicate the ports 104 and 108. Typically, the valve member 110 can exhibit a quarter-inch movement for a one-inch piston movement.

A chamber 124 is defined adjacent the upper surface of the piston 122. The chamber 124 corresponds to the constant pressure chamber 62 illustrated in FIGURE 2. Thus a constant pressure P1B is established in this chamber. The chamber 124 communicates through port 126 with the previously referred to check valves 94 and 96.

In the operation of the valve assembly of FIGURES 3 and 4, initially consider the valve member 110 to be in its uppermost position communicating ports 104 and 108. Thus low pressure is connected to the conduit 76. As previously discussed, when the pressure in the chambers 64 and 68 (FIGURE 2) equalizes at the low pressure of the compressor 72, the pressure P1B in chamber 24 acting on the end surface of the piston 122 will force the piston downwardly to compress the volume V3A shown in FIGURE 2. Toward the end of the movement of piston 122, the valve member 110 will be pulled downwardly when the key 122 engages the terminal stop 118. In its lower position, the annular slot 114 in the valve member 110 will communicate the high pressure port 102 with the port 106 thereby applying a high pressure directly to the chamber 64 of FIGURE 2 and through the regenerator to the chamber 68. When these pressures equalize, of course, the displacer will be forced upwardly. Accordingly, it should now be apparent that the structurally illustrated valve assembly of FIGURES 3 and 4 is the equivalent of the valve assembly 74 in FIGURE 2 and will satisfactorily operate to duplicate the thermodynamic cycle described in the aforecited patent.

It is important to note that the time delay due to the regenerator should operate to produce the desired result. More specifically, the linkage between the valve member 110 and piston 122 in FIGURE 4 should be so designed that when the piston moves downwardly, it starts to pull the valve member 110 down toward the end of its movement. Inasmuch as a braking force may be encountered, it is important that the valve member get just far enough to begin to admit the high pressure gas from port 102 through port 106 to the upper surface of the displacer. The high pressure momentarily acting on the upper displacer surface (i.e. in chamber 64 of FIGURE 2), insures completion of the downward stroke. Similarly, completion of the upward stroke is assured by designing the components such that the greater pressure on the lower displacer surface (i.e. in chamber 68 of FIGURE 2), as compared to the pressure in chamber 64, will force the displacer upwardly.

Figure 5:
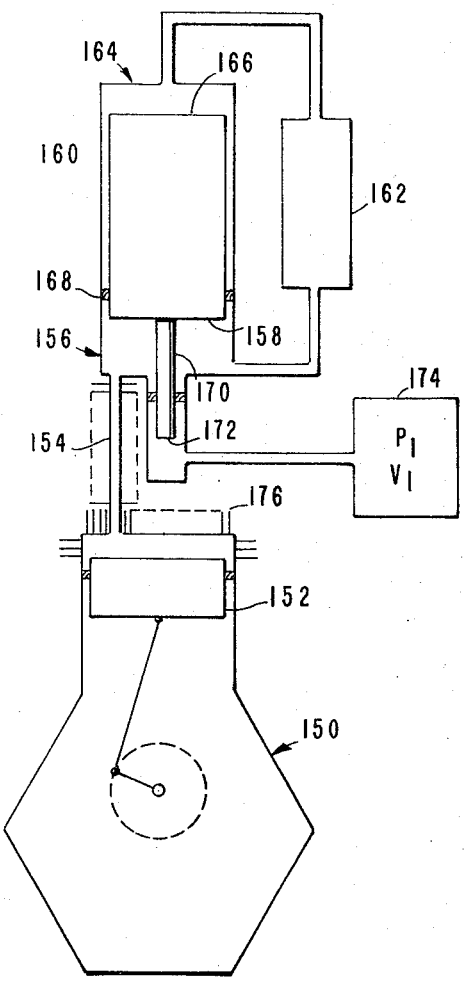
FIGURE 5 is a schematic illustration of a Sterling cycle refrigeration system employing the teachings of the present invention.

Although the discussion thus far has pertained to the application of the invention to a gas balancing refrigeration apparatus, it should be understood that the teachings are applicable to other types of refrigeration apparatus. In order to demonstrate this, FIGURE 5 schematically illustrates a refrigeration apparatus operable in accordance with a Sterling cycle which is similar to the gas balancing cycle. More particularly, the apparatus of FIGURE 5 includes an apparatus 150 for reciprocally driving a compressor piston 152 which communicates with the port 154. The port 154 communicates with a chamber 156 to which the surface 158 of the displacer 160 is exposed. The chamber 156 communicates through the regenerator 162 with the chamber 164 to which the displacer surface 166 is exposed. Seal 168 isolates chamber 156 from chamber 164. Drive piston 170 is fixed to displacer 160. The free end surface 172 thereof communicates with chamber 174 in which a constant intermediate pressure is maintained.

In the operation of the apparatus of FIGURE 5, on the compression stroke of the apparatus 150, the displacer 160 is up and remains there until near the peak pressure point when the drive piston 152 is forced downwardly by the high pressure. The displacer 160 transfers gas through the regenerator 162 to the cold end of the displacer adjacent cooling fins 176. On the expansion stroke of the apparatus 150, the displacer remains down and gas expands through the regenerator 162. Subsequently, the intermediate pressure on the surface 172 of the piston 170 moves the displacer up and drives the remaining cold gas out through the regenerator 162. The cycle then repeats.

From the foregoing, it should be appreciated that an apparatus has been disclosed herein in which a constant source of intermediate pressure is employed to reciprocally drive a displacer for effecting the compression and expansion of a gas to thereby effect cooling. Although specific embodiments of the invention have been disclosed herein, it is recognized that variations and modifications will occur to those skilled in the art falling within the spirit of the invention and accordingly it is not intended that the scope of the invention be limited by the specifically disclosed embodiments.

What is claimed is:

1. In a refrigeration apparatus including a displacer mounted for reciprocal movement between first and second variable volume chambers to alternatively effect compression and expansion thereof;
   a piston coupled to said displacer and defining an end surface remote therefrom;
   a third chamber;
   said piston end surface being disposed within said third chamber; and
   means establishing a constant pressure within said third chamber.

2. The apparatus of claim 1 including low and high pressure sources; and
   means alternately coupling said low and high pressure sources to both said first and second chambers.

3. The apparatus of claim 2 including time delay introducing means for causing each of said pressure sources to be coupled to said second chamber prior to being coupled to said first chamber.

4. The apparatus of claim 3 wherein said time delay introducing means includes a regenerator.

5. The apparatus of claim 2 wherein said pressure established in said third chamber has a value intermediate said high and low pressures.

6. The apparatus of claim 2 including a valve member movable between first and second positions respectively coupling said low and high pressure sources to both said first and second chambers; and
   means responsive to the movement of said displacer for moving said valve member between said first and second positions.

7. In combination with a displacer mounted for reciprocal movement between a first position in which the volumes of first and second chambers are respectively maximized and minimized and a second position in which the volumes of said first and second chambers are respectively minimized and maximized;
   a position coupled to said displacer and defining an end surface remote therefrom;
   a third chamber;
   said piston end surface being disposed within said third chamber;
   means alternately supplying a gas at high and low pressures to said first and second chambers; and
   means establishing a constant pressure intermediate said high and low pressures in said third chamber.

8. The combination of claim 7 wherein said means supplying said gas to said first and second chambers includes a conduit coupled directly to said first chamber and through a heat removal means to said second chamber.

9. The combination of claim 7 wherein said means alternately supplying said gas at high and low pressures includes a valve assembly responsive to the movement of said displacer.

References Cited

UNITED STATES PATENTS

| | | | |
|---|---|---|---|
| 3,045,436 | 7/1962 | Gifford | 62—6 |
| 3,091,092 | 5/1963 | Dros | 62—6 |
| 3,119,237 | 1/1964 | Gifford | 62—6 |
| 3,188,819 | 6/1965 | Hogan | 62—6 |
| 3,188,821 | 6/1965 | Chellis | 62—6 |
| 3,312,072 | 4/1967 | Gifford | 62—6 |

WILLIAM J. WYE, *Primary Examiner.*